US011475318B2

(12) United States Patent
Trim et al.

(10) Patent No.: US 11,475,318 B2
(45) Date of Patent: Oct. 18, 2022

(54) AUTOMATED RESOLUTION OF OVER AND UNDER-SPECIFICATION IN A KNOWLEDGE GRAPH

(71) Applicant: KYNDRYL, INC., New York, NY (US)

(72) Inventors: Craig M. Trim, Ventura, CA (US); Mary E. Rudden, Denver, CO (US); Mauro Marzorati, Lutz, FL (US); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 812 days.

(21) Appl. No.: 16/425,102

(22) Filed: May 29, 2019

(65) Prior Publication Data

US 2020/0380377 A1 Dec. 3, 2020

(51) Int. Cl.
*G06N 5/02* (2006.01)
*G06N 5/04* (2006.01)
*G06K 9/62* (2022.01)

(52) U.S. Cl.
CPC .......... *G06N 5/022* (2013.01); *G06K 9/6219* (2013.01); *G06K 9/6231* (2013.01); *G06K 9/6264* (2013.01); *G06N 5/04* (2013.01)

(58) Field of Classification Search
None
See application file for complete search history.

(56) References Cited

U.S. PATENT DOCUMENTS 9,613,070 B2  4/2017  Kumar et al.
10,664,757 B2 * 5/2020  Lastras-Montano ... G06N 5/022
(Continued)

FOREIGN PATENT DOCUMENTS

CN    109522192   3/2019
WO   2007002380   1/2007
(Continued)

OTHER PUBLICATIONS

Lin et al. "Learning Relational Bayesian Classifiers from RDF Data", http://www.cs.iastate.edu/~honavar/Papers/iswc2011.pdf, Department of Computer Science Iowa State University, Oct. 23-27, 2011, The Semantic Web—ISWC 2011, Lecture Notes in Computer Science, vol. 7031, Springer, Berlin, Heidelberg, 16 pages.
(Continued)

*Primary Examiner* — Anand P Bhatnagar
(74) *Attorney, Agent, or Firm* — Erik Swanson; Andrew M. Calderon; Calderon Safran & Cole P.C.

(57) ABSTRACT

Systems and methods for automated resolution of over-specification and under-specification in a knowledge graph are disclosed. In embodiments, a method includes: determining, by a computing device, that a size of an object cluster of a knowledge graph meets a threshold value indicating under-specification of a knowledge base of the knowledge graph; determining, by the computing device, sub-classes for objects of the knowledge graph; re-initializing, by the computing device, the knowledge graph based on the sub-classes to generate a refined knowledge graph, wherein the size of the object cluster is reduced in the refined knowledge graph; and generating, by the computing device, an output based on information determined from the refined knowledge graph.

25 Claims, 7 Drawing Sheets

(56) References Cited

U.S. PATENT DOCUMENTS

| | | | |
|---|---|---|---|
| 11,074,652 B2* | 7/2021 | Crabtree | G06F 16/951 |
| 2016/0103932 A1* | 4/2016 | Sathish | G06F 9/4451 |
| | | | 715/767 |
| 2017/0032249 A1 | 2/2017 | Chougule et al. | |
| 2018/0129690 A1 | 5/2018 | Jagannath et al. | |
| 2018/0187104 A1* | 7/2018 | Yusuf | C10G 67/0409 |
| 2018/0322954 A1 | 11/2018 | Ding et al. | |
| 2019/0080245 A1* | 3/2019 | Hickman | G06N 5/022 |
| 2019/0266341 A1* | 8/2019 | Ravizza | G06F 21/6218 |
| 2019/0317965 A1* | 10/2019 | Remis | G06F 16/367 |
| 2019/0325329 A1* | 10/2019 | Rais-Ghasem | G06F 16/325 |
| 2019/0347668 A1* | 11/2019 | Williams | H04L 67/566 |
| 2020/0081445 A1* | 3/2020 | Stetson | G06N 5/02 |
| 2022/0067750 A1* | 3/2022 | Williams | G06Q 30/016 |

FOREIGN PATENT DOCUMENTS

| | | |
|---|---|---|
| WO | 2014210501 | 12/2014 |
| WO | 2015047837 | 4/2015 |
| WO | 2019005606 | 1/2019 |

OTHER PUBLICATIONS

Anonymous, "argmax() funtion", IBM.com, https://www.ibm.com/support/knowledgecenter/en/SSPT3X_3.0.0/com.i, accessed Mar. 29, 2019, 1 page.

Anonymous, "Build on the AI platform for business", IBM.com, https://www.ibm.com/watson/developer/, accessed May 28, 2019, 1 page.

International Search Report and Written Opinion issued in Application No. PCT/IB2020/054326 dated Aug. 31, 2020, 9 pages.

* cited by examiner

AUTOMATED RESOLUTION OF OVER AND UNDER-SPECIFICATION IN A KNOWLEDGE GRAPH

BACKGROUND

The present invention relates generally to data analysis and, more particularly, to automated resolution of over-specification and under-specification in a knowledge graph.

Big Data is a field concerned with analyzing, extracting information from, or otherwise dealing with large data sets that are too complex for traditional data-processing application software. Various computing modeling tools and techniques are available for analyzing and extracting information from data sets. Graph models and relational databases are often utilized to extract information from data sets for a particular domain (i.e., sphere of activity or knowledge). One tool utilized by analysts is a knowledge graph. The term knowledge graph as used herein refers to a graph that integrates information into an ontology and applies a reasoner to derive new knowledge. A knowledge graph comprises a network of entities that are relevant to a specific domain or to an organization.

SUMMARY

In an aspect of the invention, a computer-implemented method includes: determining, by a computing device, that a size of an object cluster of a knowledge graph meets a threshold value indicating under-specification of a knowledge base of the knowledge graph; determining, by the computing device, sub-classes for objects of the knowledge graph; re-initializing, by the computing device, the knowledge graph based on the sub-classes to generate a refined knowledge graph, wherein the size of the object cluster is reduced in the refined knowledge graph; and generating, by the computing device, an output based on information determined from the refined knowledge graph. Advantageously, the method enables automatic identification of under-specification without the need for an analyst with specialized knowledge of the knowledge graph domain.

In embodiments, the determining the sub-classes for the knowledge graph includes determining parent-child relationships within a latent hierarchical structure of the knowledge base. Such methods advantageously utilize the identification of latent hierarchical structure in the knowledge base to automatically address under-specification of the knowledge graph domain.

In other embodiments, the determining the sub-classes for the knowledge graph includes determining the sub-classes for the knowledge graph based on peer nodes. Such methods advantageously utilize the identification of latent peer-to-peer relationships in the knowledge base to automatically address under-specification of the knowledge graph domain.

In another aspect of the invention, there is a computer program product including a computer readable storage medium having program instructions embodied therewith. The program instructions are executable by a computing device to cause the computing device to: generate a knowledge graph from a knowledge base; determine that a size of an object cluster of the knowledge graph meets a threshold value indicating under-specification of the knowledge base; determine sub-classes for objects of the knowledge graph; and re-initialize the knowledge graph based on the sub-classes to generate a refined knowledge graph, wherein the size of the object cluster is reduced in the refined knowledge graph. Advantageously, the computer program product enables automatic identification of under-specification without the need for an analyst with specialized knowledge of the knowledge graph domain.

In embodiments, the determining the sub-classes for the knowledge graph includes determining parent-child relationships within a latent hierarchical structure of the knowledge base. Such computer program products advantageously utilize the identification of latent hierarchical structure in the knowledge base to automatically address under-specification of the knowledge graph domain.

In other embodiments, the determining the sub-classes for the knowledge graph includes determining the sub-classes for the knowledge graph based on peer nodes. Such computer program products advantageously utilize the identification of latent peer-to-peer relationships in the knowledge base to automatically address under-specification of the knowledge graph domain.

In another aspect of the invention, there is a system including a processor, a computer readable memory and a computer readable storage medium associated with a computing device. The system also includes: program instructions to generate a knowledge graph from a knowledge base; program instructions to determine whether a size of an object cluster of the knowledge graph meets a threshold value indicating under-specification of the knowledge base; program instructions to determine sub-classes for objects of the knowledge graph based on a determination that the size of the object cluster of the knowledge graph meets the threshold value; program instructions to re-initialize the knowledge graph based on the sub-classes to generate a refined knowledge graph, wherein the size of the object cluster is reduced in the refined knowledge graph; program instructions to determine whether over-specification of the knowledge base exists by performing a clustering analysist utilizing a Voronoi cells cluster initialization formula; and program instructions to re-initialize the knowledge graph based on the determining the over-specification to generate an updated knowledge graph wherein entities of over-specified object clusters of the refined knowledge graph are subsumed into a single cluster of the updated knowledge graph. The program instructions are stored on the computer readable storage medium for execution by the processor via the computer readable memory. Advantageously, the system enables automatic identification of over-specification and under-specification without the need for an analyst with specialized knowledge of the knowledge graph domain.

In embodiments, the determining the sub-classes for the knowledge graph includes determining parent-child relationships within a latent hierarchical structure of the knowledge base. Such systems advantageously utilize the identification of latent hierarchical structure in the knowledge base to automatically address under-specification of the knowledge graph domain.

In embodiments, the determining the sub-classes for the knowledge graph comprises determining the sub-classes for the knowledge graph based on peer nodes. Such systems advantageously utilize the identification of latent peer-to-peer relationships in the knowledge base to automatically address under-specification of the knowledge graph domain.

In an aspect of the invention, a computer-implemented method includes: accessing, by a computing device, a knowledge graph generated for a knowledge base; determining, by the computing device, over-specification of the knowledge base based on one or more object clusters of the knowledge graph having less than a threshold amount of data points; and re-initializing, by the computing device, the knowledge graph based on the determining the over-specification to generate an updated knowledge graph wherein entities of over-specified object clusters of the knowledge graph are subsumed into a single object cluster of the updated knowledge graph. Such methods enable the determination of over-specification of a knowledge graph without requiring an analyst to have any specialized knowledge of the subject matter of the knowledge base.

In implementations, the determining the over-specification includes performing a clustering analysis utilizing a Voronoi cells cluster initialization formula.

In another aspect of the invention, there is a computer program product including a computer readable storage medium having program instructions embodied therewith. The program instructions are executable by a computing device to cause the computing device to: access a knowledge graph generated for a knowledge base; determine over-specification of the knowledge base based on one or more object clusters of the knowledge graph having less than a threshold amount of data points; and re-initialize the knowledge graph based on the determining the over-specification to generate an updated knowledge graph wherein entities of over-specified object clusters of the knowledge graph are subsumed into a single object cluster of the updated knowledge graph.

In implementations, the determining the over-specification includes performing a clustering analysis utilizing a Voronoi cells cluster initialization formula.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
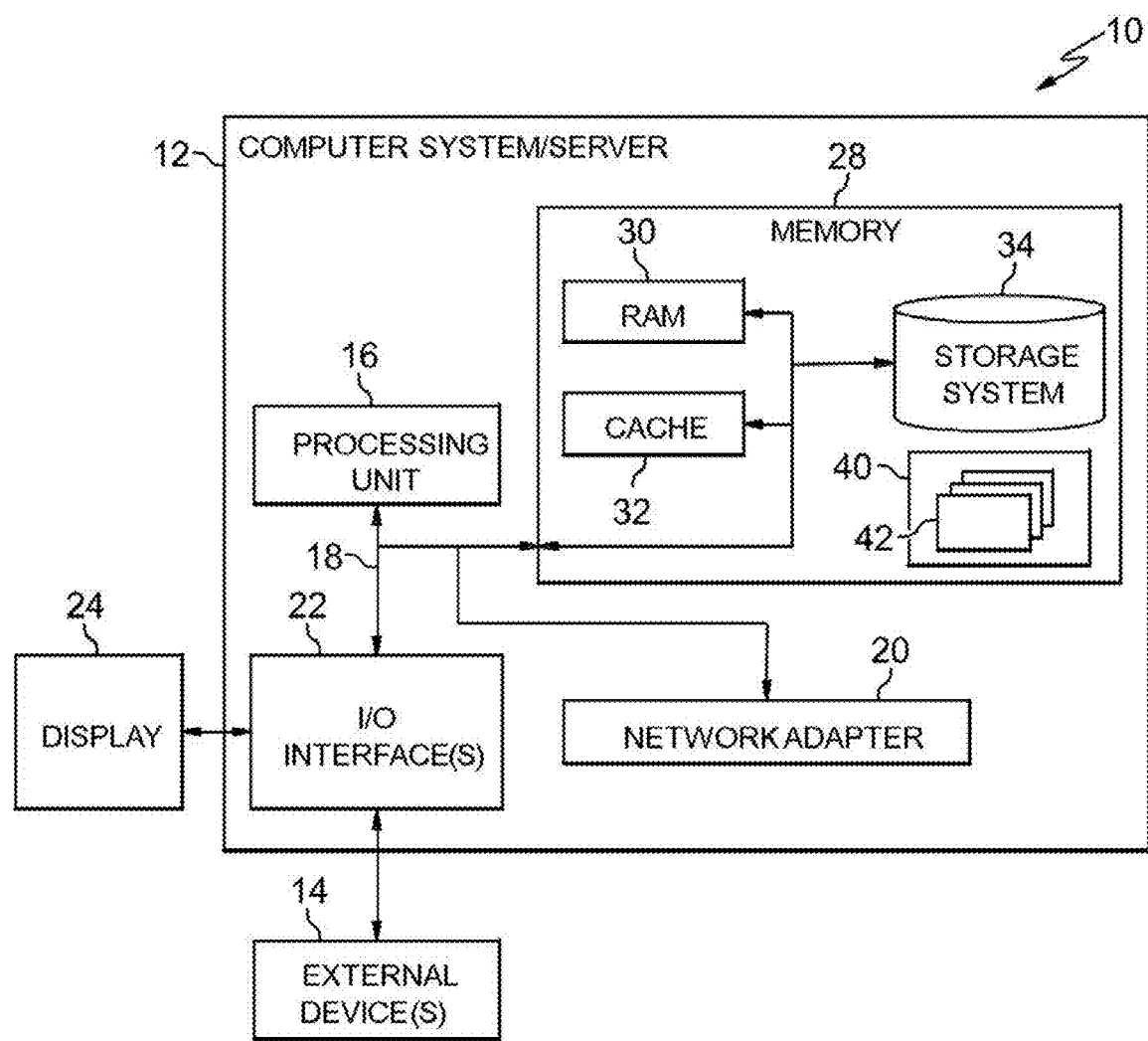
FIG. 1 depicts a computing infrastructure according to an embodiment of the present invention.

The present invention relates generally to data analysis, and more particularly, to automated resolution of over-specification and under-specification in a knowledge graph. Embodiments of the present invention provide a system for automatically detecting over-specification and under-specification of a knowledge base based on object node clustering in a knowledge graph.

In general, the use of a graph model (graph paradigm) may indicate to a user (e.g., a data analyst) that a domain of interest is too large to understand completely, and too dynamic to model in a relational database (relational paradigm), where schema changes (changes to a set of conditions and entities that establish the domain) can have a severe impact on software applications dependent on the graph model. In cases where a graph paradigm is leveraged, techniques for building out a graph schema or g-schema often feature an automated component. In many cases, a knowledge graph is built by hand and supplemented through automated techniques. In more rare cases, or in situations where noise is more readily tolerated, the entire g-schema may be developed through an automated approach. In either methodology, it is advantageous to indicate where an entity (a type or category of object within the modeled data) may be over-specified (over-generalized) or underspecified. The terms underspecified and under-specification as used herein refer to insufficient or insufficiently precise information, or information which is specified incompletely. Conversely, in other situations an entity may be overly specified or decomposed (broken down into component elements of the entity) and should be more generalized. The terms overly specified, over-specification, and over-specified as used herein refer to data that is excessively specified. Either error (under-specification or over-specification) is possible, whether developing models by manual or automated means, and should be corrected for a more efficient model and to accurately reflect a state of the domain.

Many information systems have a hybrid approach utilizing relational databases and graphs to performing discover-oriented data searches, workflow (dialog tree) traversals and single right-answer queries. A single knowledge graph that is capable of providing the necessary input for all cases is extremely complex and is not typically available. Today's cutting-edge information systems require a variety of data storage and retrieval techniques with complex back-end integration. Embodiments of the present invention enable a single graph schema to act as a source of true information and help allocate scarce resources for continual refinement and augmentation of a graph from knowledge sources (i.e., one or more sources of data). Accordingly, embodiments of the present invention provide a technical solution to the technical problem of over or under-specification of data sets in graphical modeling implementations.

Advantageously, embodiments of the invention provide improvements in the form of additional functionality to data modeling computing devices and to the technical field of computer data modeling. More specifically, aspects of the invention utilize unconventional steps including automated determination of over-specification and/or under-specification utilizing cluster analysis of graphed objects to generate refined graphical models.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
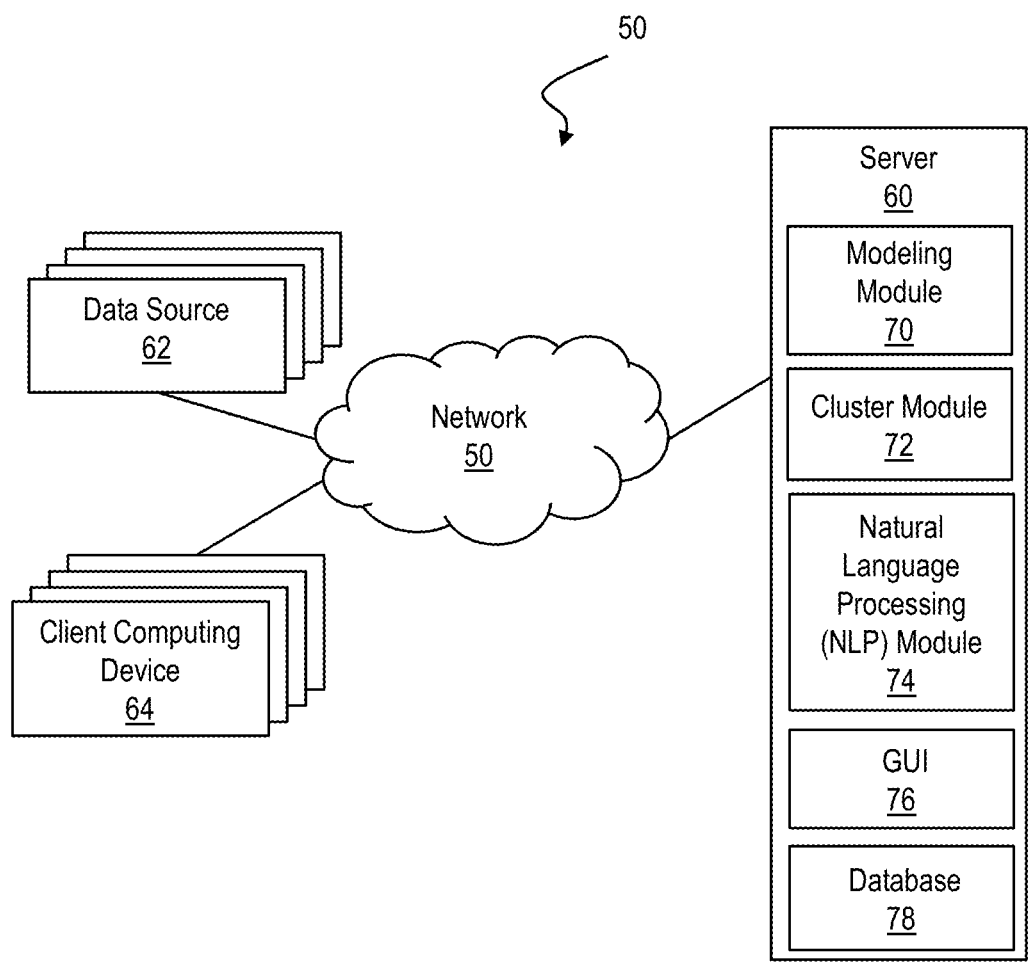
FIG. 2 shows an exemplary environment in accordance with aspects of the invention.

FIG. 2 shows an exemplary environment in accordance with aspects of the invention. The environment includes a network 50 connecting a server 60 to one or more data sources 62 and/or one or more client computing devices 64. The server 60 may comprise the computer system 12 of FIG. 1 and may be connected to the network 50 via the network adapter 20 of FIG. 1. The server 60 may be configured as a special purpose computing device that is part of a data management and analysis system. For example, the server 60 may be configured to collect data (e.g., big data) from one or more of the data sources 62 of clients for management and/or analysis and reporting.

The network 50 may be any suitable communication network or combination of networks, such as a local area network (LAN), a general wide area network (WAN), and/or a public network (e.g., the Internet). The data source 62 may be any source of data, such as client databases or third party data sources (e.g., social media server, etc.). The server 60 may be configured to provide data management and analysis services or outputs to one or more client computing devices represented at 64. The client computing devices may include the components of the computer system 12 of FIG. 1, and may be desktop computers, laptop computers, tablets, smartphones or other types of computing devices.

Still referring to FIG. 2, the server 60 may include one or more program modules (e.g., program module 42 of FIG. 1) executed by the server 60 and configured to perform one or more of the functions described herein. In embodiments, the server 60 includes a modeling module 70 configured to provide modeling tools and functions for the analysis of a knowledge base; a cluster module 72 configured to determine instances of under-specification or over-specification (over-generalization) in a knowledge graph; and a natural language processing (NPL) module 74 configured to identify objects in a knowledge base having similar relationships. The term knowledge base as used herein refers to a set of data, which may comprise data gathered from a plurality of sources (e.g., the data sources 62). The term knowledge graph as used herein refers to a graph that integrates information into an ontology and applies a reasoner to derive new knowledge. A knowledge graph comprises a network of entities that are relevant to a specific domain or to an organization. In aspects, a knowledge graph of the present invention comprises large networks of entities, their semantic types, properties and relationships between entities. The term semantic refers to the meaning of the data that is encoded alongside the data in the graph, in the form of the ontology.

In embodiments, the server 60 includes a graphical user interface (GUI) 76 by which a user may input information (e.g., instructions, data, etc.), and a database 78 for storing data sets utilized by the server 60 and/or data outputs of the server 60. In embodiments, the server 60 is configured for use in the field of Big Data (i.e., ways to analyze, systematically extract information from, or otherwise deal with data sets that are too large or complex to deal with by traditional data-processing application software).

In embodiments, the server 60 may include additional or fewer components than those shown in FIG. 2. In embodiments, separate components may be integrated into a single computing component or module. Additionally, or alternatively, a single component may be implemented as multiple computing components or modules.

Figure 3:
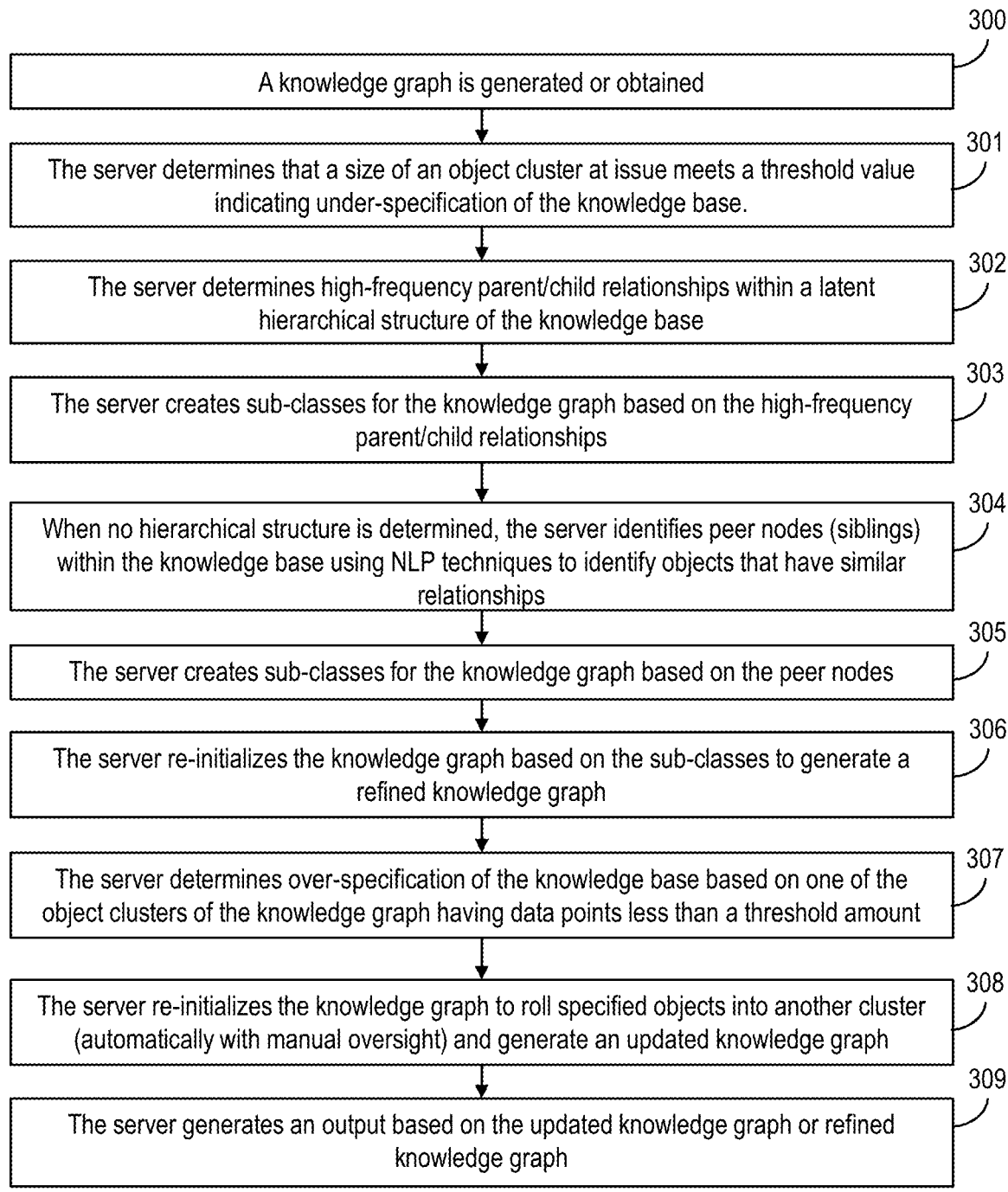
FIG. 3 shows a flowchart of steps of an exemplary method in accordance with aspects of the invention.

FIG. 3 shows a flowchart of an exemplary method in accordance with aspects of the invention. Steps of the method of FIG. 3 may be performed in the environment illustrated in FIG. 2 and are described with reference to elements shown in FIG. 2.

At step 300, the server 60 generates or obtains a knowledge graph, wherein the knowledge graph is based on a knowledge base (one or more sets of data). As mentioned above, the term knowledge graph as used herein refers to a graph that integrates information into an ontology and applies a reasoner to derive new knowledge. More specifically, the knowledge graph comprises a network of entities that are relevant to a specific domain or to an organization. For example, a knowledge graph may be generated for applications in the medical field, oil and gas field, or other fields or industries. In aspects, a knowledge graph of the present invention comprises large networks of entities, their semantic types, properties and relationships between entities. Various methods for creating a knowledge graph may be utilized in accordance with step 300. For example, application programing interface (API) toolkits or artificial intelligence (AI) data kits may be utilized by a data analysist or the like to generate a knowledge graph from data utilizing existing techniques and/or software. In implementations, the modeling module 70 of the server 60 generates the knowledge graph in accordance with step 300. Alternatively, a user may obtain a knowledge graph that has already been generated, such as from a client computing device 64. The knowledge graph may be generated based on data aggregated from a plurality of sources (e.g., the data sources 62). In aspects, the knowledge graph is generated from a knowledge base (one or more sets of data) using schema that establishes a domain, wherein the graph depicts one or more object clusters (i.e., a group of similar objects positioned or occurring closely together in the graph).

At step 301, the server 60 determines that a size of an object cluster of the knowledge graph of step 300 meets a threshold value indicating under-specification of the knowledge base. As noted above, the term underspecified or under-specification as used herein refers to insufficient or insufficiently precise information, or information which is specified incompletely. In implementations, the cluster module 72 of the server 60 determines under-specification in accordance with step 301. In cases where a clustering step is performed in the graphing of data, if a given entity appears to have predominantly dense clusters disproportionate to surrounding clusters on the graph, such disproportionately dense clusters indicate a likely case of under-specification. Thus, embodiments of the invention use clusters to find probable cause for under-specification of a knowledge base, wherein the under-specification is measured not on an absolute or heuristic basis, but relative to groups located within the given corpus (a main body or collection of data), or within all corpora in that domain.

Still referring to step 301 of FIG. 3, in embodiments, an argmax (arguments of the maxima) function is utilized to determine critical points of the domain within a cluster at which the size is larger than the surrounding cluster groups. In mathematics, the argmax are the points of a domain of some function at which the function values are maximized. The detection of a cluster size which denotes a hypothetical under-specification can be solved using a formula that would threshold the total percentages for each cluster, such that if any one group or cluster were n % more of the aggregate data than the other combined clusters, the server 60 detects an indication of under-specification. The formula for this determination can be expressed as: $\delta = \chi - \eta$; wherein $\chi$ is the hypothetical split (i.e., the desired hypothetical average number of elements in a cluster), wherein $\chi$ is the actual split (i.e., the actual number of elements in a cluster), and wherein $0 \leq \delta \geq a$ threshold value indicates the degree of under-specification. In aspects, the server 60 utilizes predetermined rules to determine if a high degree of under-specification (as defined by rules and threshold values) requires an action to be taken in accordance with step 302.

The ability to decompose an under-specified entity is latent in a knowledge graph. The term decompose as used herein refers to the breaking down of an object or entity into component elements of the object or entity, or further-specifying the object or entity. Advantageously, embodiments of the invention enable the cluster module 72 of the server 60 to determine likely instances of under-specification without the need for an analyst to have any particular knowledge or training regarding the domain of the knowledge graph. For example, a knowledge graph including clusters of objects related to a medical field could be analyzed by the cluster module 72 for likely instances of under-specification without a user having knowledge in that particular medical field. That is, a user need not apply any manual or mental analysis of the knowledge graph to determine whether clusters of objects should be further decomposed. This is particularly beneficial when an analyst has no particular knowledge or skill in the domain of the knowledge base. Knowledge graphs are often utilized to generate sub-graphs to provide additional information with respect to clustered objects. Accordingly, embodiments of the invention enable the creation of sub-graphs from clusters that would not be created but for the determination of under-specification at step 301.

At step 302, the server 60 determines high-frequency parent-child relationships within a latent hierarchical structure of the knowledge base (when a hierarchical structure is present) in response to the determination of step 301. In aspects, the NLP module 74 of the server 60 performs an NLP pattern matching analysis (e.g., Is-a pattern extraction) to determine high-frequency parent-child relationships within the knowledge base based on predetermined rules and/or threshold values. For example, the NLP module 74 may identify keywords indicating parent-child relationships among categories of data in the knowledge base.

At step 303, the server 60 creates sub-classes for the knowledge graph based on the high-frequency parent/child relationships determined at step 302. In embodiments, the NLP module 74 of the server 60 implements step 304. In aspects, the server 60 utilizes term frequency-inverse document frequency (TD-IDF) matching to create multiple sub-classes based on the parent/child relationships determined at step 302. In general, TD-IDF matching finds words or terms that are not rare or frequent, but somewhere in the middle. Thus, in aspects, the cluster identified at step 301 as being under-specified is decomposed into sub-classes based on applicable high-frequency parent/child relationships determined at step 302.

At step 304, in response to the determination at step 302 and when no hierarchical structure is present within the knowledge base, the server 60 identifies peer nodes (siblings) within the knowledge base using NLP techniques to identify objects that have similar relationships (e.g., a computed node similarity meeting a predetermined threshold value). In implementations, the NLP module 74 of the server 60 implements step 304. In aspects, pattern matching complexity is solvable via NLP techniques that look for objects that have similar relationships (e.g., based on predetermined rules) and use this to compute node similarity.

At step 305, the server 60 creates sub-classes for the knowledge graphs based on the peer nodes identified at step 304. In implementations, the NLP module 74 performs step 305. In aspects, the cluster identified at step 301 as being under-specified is decomposed into sub-classes based on the identified peer nodes of step 304. In aspects, the output of step 305 is a suggestion to solve under-specification.

At step 306, the server 60 re-initializes or updates the knowledge graph based on the sub-classes generated at steps 303 or 305 to generate a refined knowledge graph. The refined knowledge graph includes more clusters than are present in the original knowledge graph, providing a more specified knowledge graph. In aspects, the server 60 utilizes the Veronoi cells cluster initialization formula $\sigma \propto (\omega+1)$, wherein the cluster determined to be under-specified at step 301 is re-initialized with cluster centroids equivalent to: cluster initialization formula: $\sigma \propto (\omega+1)$.

At step 307, the server 60 determines over-specification of the knowledge base based on one or more of the object clusters of the knowledge graph having less than a threshold amount of data points. It should be understood that step 307 may be performed on the original knowledge graph or on the refined knowledge graph generated at step 306. In implementations, the cluster module 72 of the server implements step 307. In implementations, the server 60 identifies clusters of the knowledge graph that comprise over-specified portions of the knowledge base, and objects of those clusters.

At step 308, the server 60 re-initializes the knowledge graph to roll the objects of the over-specified clusters identified at step 307 into another cluster to produce an updated knowledge graph. In other words, objects are consolidated into a single cluster that were once groups in multiple clusters in order to de-specify the objects and produce the updated knowledge graph. Step 308 may be implemented automatically by the server 60 or with manual oversight.

At step 309, the server 60 generates an output based on the updated knowledge graph of step 308 or the refined knowledge graph of step 306. Various outputs may be generated by the server 60, including client reports including information extracted from the knowledge graphs of the present invention, or instructions to implement computer functions based on the information extracted from the knowledge graphs of the present invention. In aspects, the server generates a report based on knowledge from the refined knowledge graph and/or updated knowledge graph and sends the report to a client computing device 64 via the network 50. It should be understood that various reporting implementations can be utilized by an analysist, or automatically by the server 60, in the performance of step 309, and the present invention is not intended to be limited by a particular output implementation.

Figure 4A:
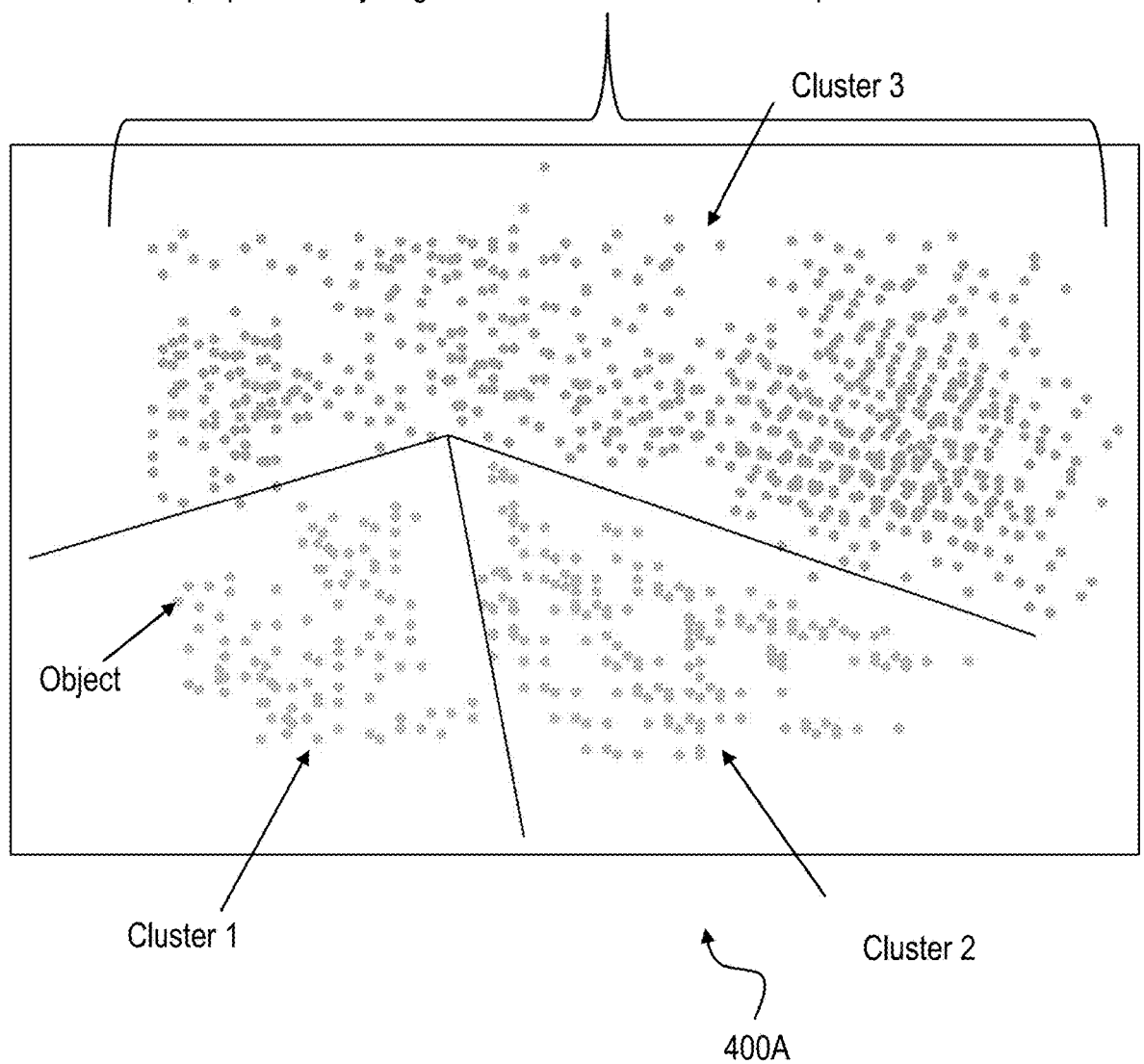
FIG. 4A shows an annotated graph for a domain indicating under-specification of a knowledge base in accordance with aspects of the invention.

FIG. 4A shows an annotated knowledge graph 400A for a domain indicating under-specification of a knowledge base in accordance with aspects of the invention. More specifically, FIG. 4A depicts the knowledge graph 400A showing objects or object nodes organized in clusters (Clusters 1-3) based on a model. The particular model utilized in the generation of the knowledge graph 400A need not be described for the purpose of this disclosure and could be any appropriate model for generating the knowledge graph 400A as determined by a data analyst. FIG. 4 represents a real-world example in which text mining has elucidated that a given entity exists (the knowledge graph represents groups of clustered entities), but the extracted object is under-specified and has latent decomposition ability. As depicted in FIG. 4, a comparison of a first cluster of objects Cluster 1 with a second cluster of objects Cluster 2 and a third cluster of objects Cluster 3, indicates that Cluster 3 has a higher density and disproportionate cluster size relative to other clusters in the same domain (Clusters 1 and 2). In this example, Cluster 3 contributes 81.5% of the data across three total entity types (represented by Clusters 1, 2 and 3).

Figure 4B:
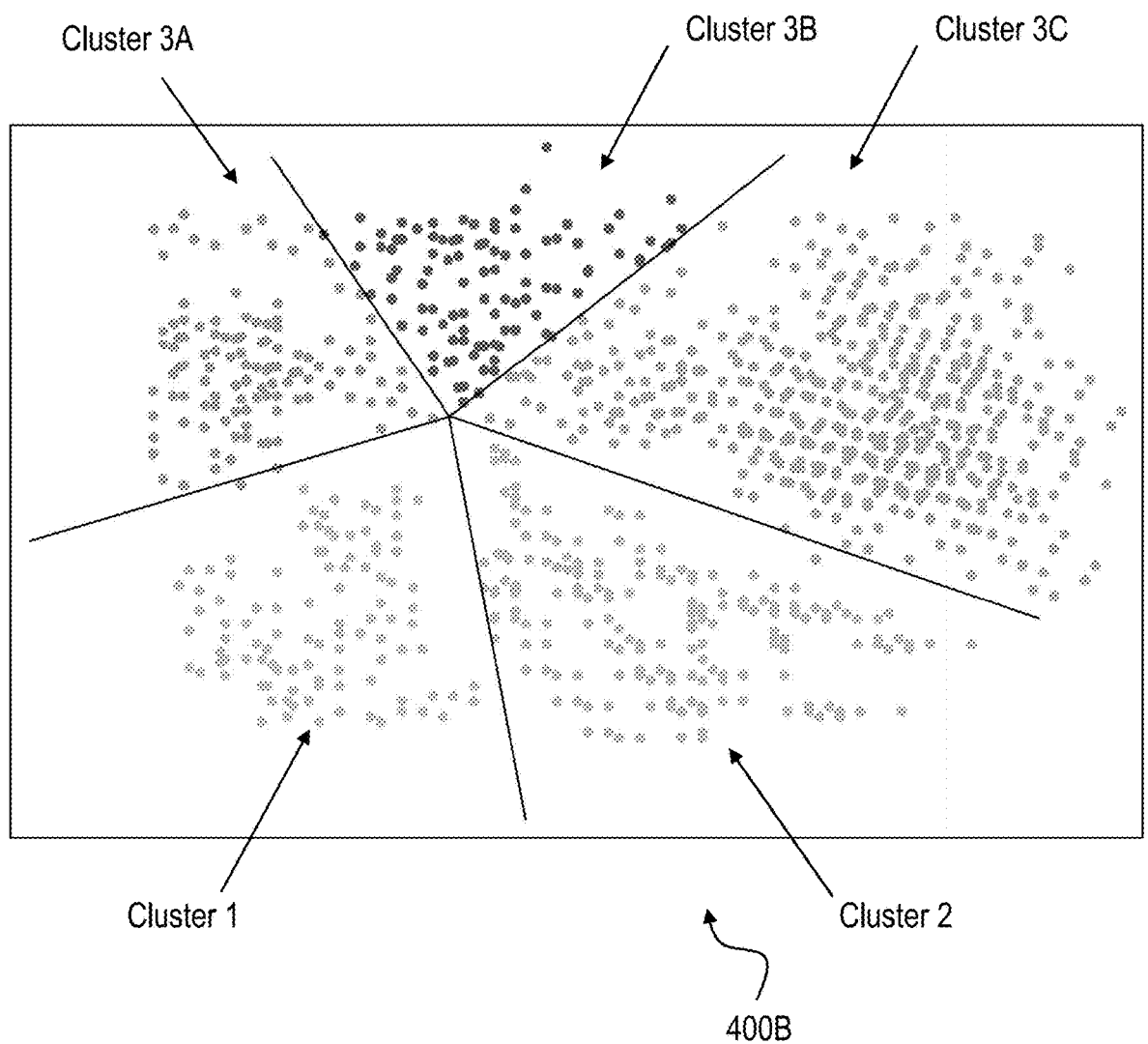
FIG. 4B shows a refined graph for the knowledge base of FIG. 4A indicating sufficient specification of the knowledge base in accordance with aspects of the invention.

FIG. 4B shows a refined knowledge graph 400B for the domain of FIG. 4A indicating sufficient specification of the knowledge base in accordance with aspects of the invention. Clusters 3A and 3B represent designated child entities decomposed correctly from the under-specified Cluster 3 of FIG. 4A. Cluster 3C represents entities that belong to the original Cluster 3 of FIG. 4A and could not be further appropriately decomposed from the original Cluster 3 of FIG. 4A.

In some cases, a knowledge graph will generate, based on a model, with an additional empty cluster, which may indicate that the model being utilized to generate the knowledge graph is sufficiently refined and that there are no missing entities. However, on most non-trivial data sets, it will not be possible to refine all entities (objects) fully.

In some cases, a knowledge graph will be generated based on a model, wherein entities will be over-specified. While each of the entity levels common to the clusters of such a graph may be common designations within the domain, the goal of an analyst is to maintain a reasonable specification level. There is no purpose to decompose entities beyond reasoning boundaries on a knowledge graph. The term reasoning boundaries as used herein refers to defined rules for how far reasoning will be taken. A cluster in a knowledge graph can be used as a boundary to constrain reasoning. Embodiments of the invention enable adjustment to the level of over-specification based on the type of inference and reasoning performed over the knowledge graph. In one example, small clusters of a knowledge graph represent a decomposition to a level that is non-essential to the reasoning ability of the knowledge graph. In this context, non-essential means an entity will not likely be populated with instance data and not have a significant number of relationship to other nodes in the graph (low cohesion).

Figure 5A:
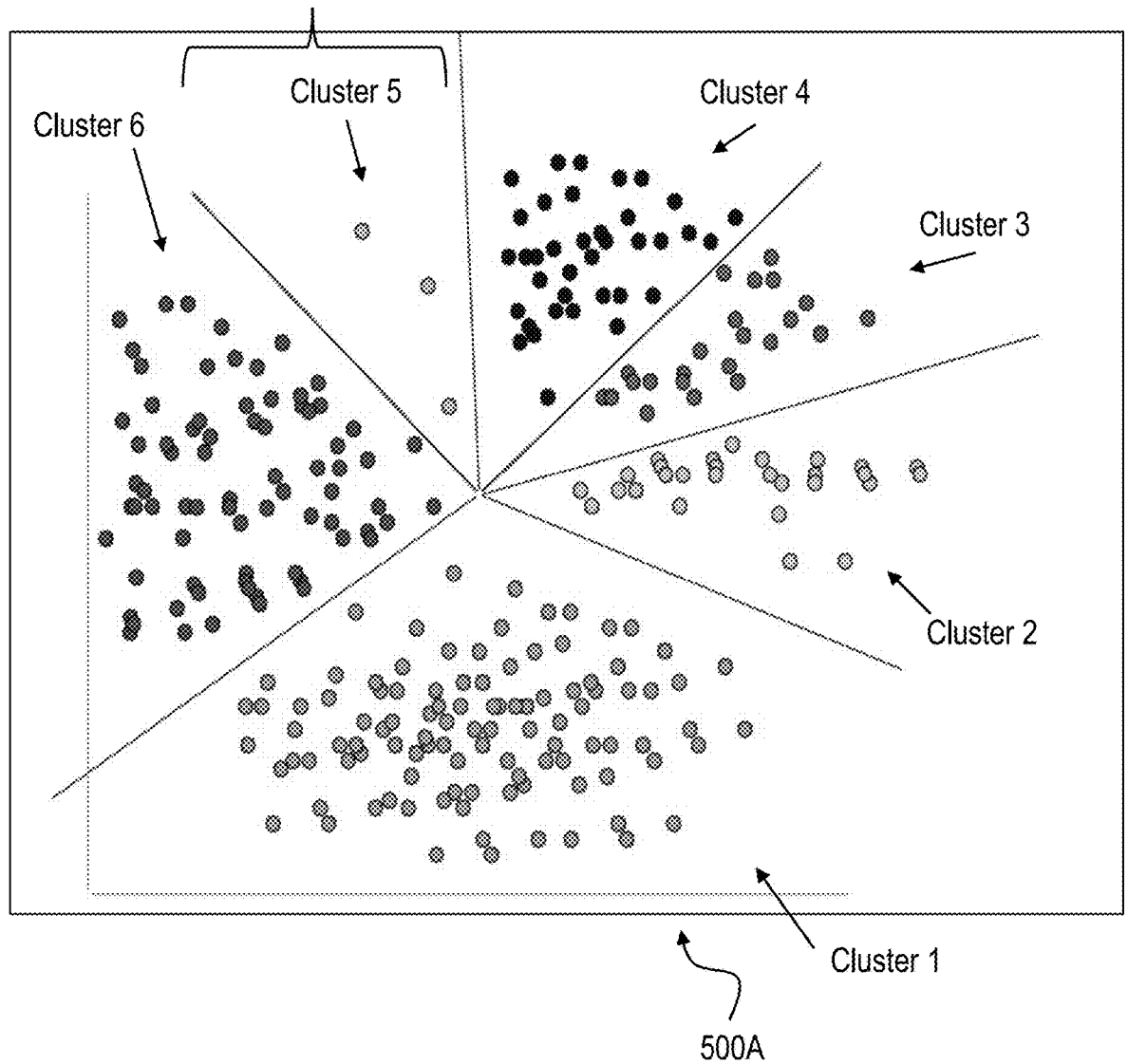
FIG. 5A shows an annotated graph for a domain indicating over-specification of a knowledge base in accordance with aspects of the invention.

FIG. 5A shows an annotated knowledge graph 500A indicating over-specification of a knowledge base. FIG. 5A represents an example of what over-specification looks like in a knowledge graph when using the clustering analysis in the Voronoi cells cluster initialization formula: $\sigma \propto (\omega+1)$ disused above. In the example of FIG. 5A, the nodes of Cluster 4 denote generic (unspecified) entities in the source data (knowledge base). The nodes of Cluster 3 represent an entity similar to the nodes of Cluster 4, but with a separate decomposition type. The nodes of Cluster 2 represent another similar entity type. The nodes of Cluster 5 represent an over-specified entity type which also has a similar type. The detection of over-specification in accordance with step 307 of FIG. 3 is not based merely on the absence of any data points for an entity type. For example, if a cluster was empty this would denote an absence of any instance of data for the cluster. In accordance with embodiments of the present invention, a threshold is established to denote over-specification. The threshold may be a predetermined general threshold value or a predetermined threshold value specific to a domain type. In the event that any cluster has n % of data points (where n is parameterized for the algorithm), the algorithm will resume with the Voronoi cells cluster initialization formula.

Figure 5B:
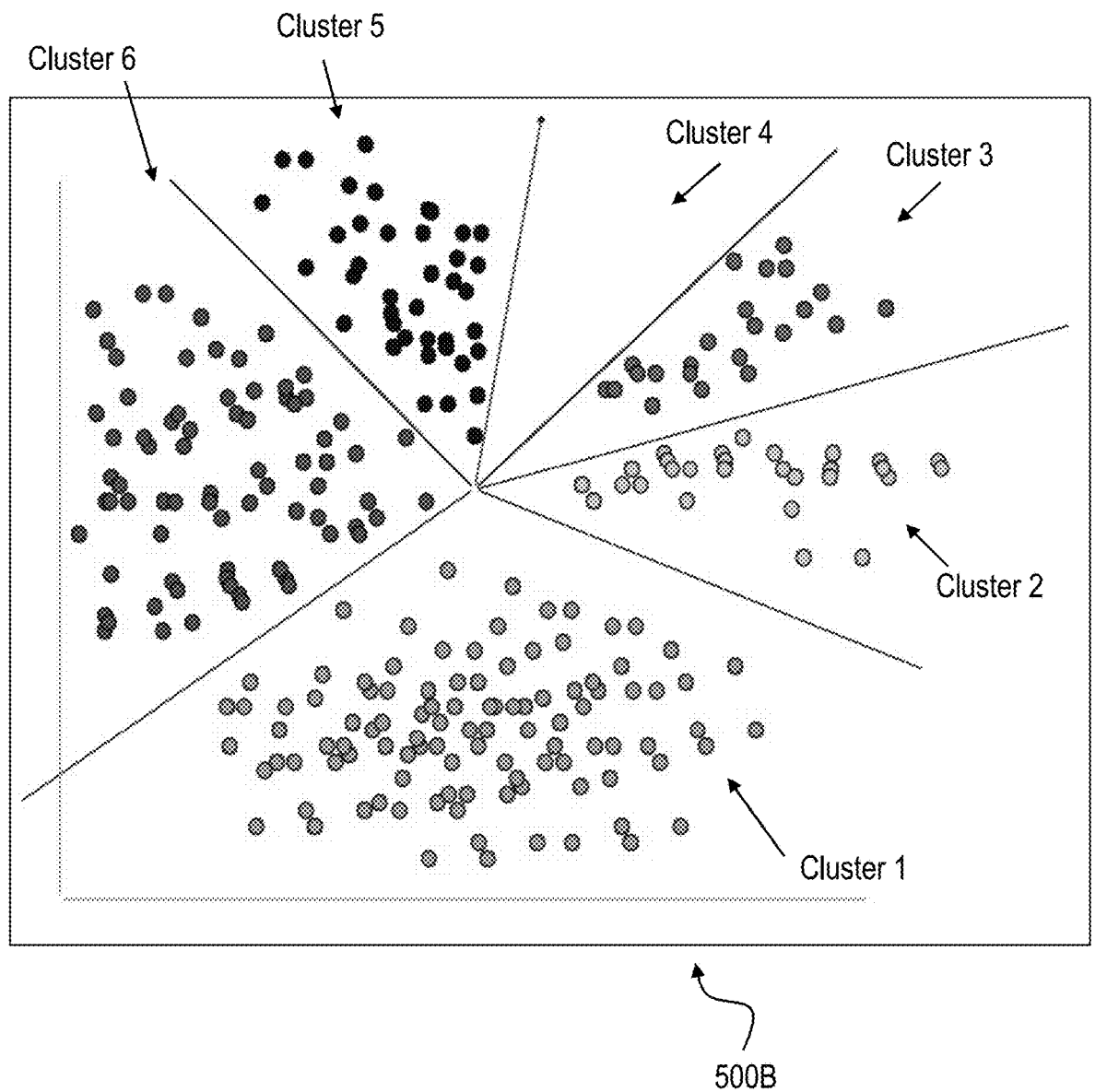
FIG. 5B shows a refined graph for the knowledge base of FIG. 5A indicating sufficient specification of the knowledge base in accordance with aspects of the invention.

FIG. 5B depicts a refined version of the annotated knowledge graph of FIG. 5A after cluster initialization. In the example of FIG. 5B, the entities of Clusters 4 and 5 of FIG. 5A have been subsumed into a generic entity Cluster 5 of FIG. 5B. An empty Cluster 4 is the n+1 cluster established in the cell initialization, which proves that there are no missing entity types within the source data (knowledge base). As a final step, an over-specified entity is removed from the knowledge graph, and any existing instance of meta-data is re-assigned to the subsuming entity. In the event that a formal World Wide Web Consortium (W3C) Web Ontology Language (OWL) graph is used, the owl:equivalentTo property of the graph can be used to denote that the two entities are equivalent for the purpose of inference. W3C OWL is a Semantic Web language designed to represent rich and complex knowledge about things, groups of things and relations between things.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for automated resolution of over or under specification of a knowledge graph. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In embodiments, a computer-implemented method of the present invention comprises detecting over-generalization and under-specification within a knowledge base using machine intelligence. In aspects, the method further comprises: in response to receiving a cluster of a knowledge graph, determining a value by subtracting an actual split in the cluster from a hypothetical split; and in response to the value being greater than or equal to zero and greater than or equal to a threshold number, determining under specification. In implementations, the method further includes in response to determining an under-specification, identifying parent/child relationships that are latent in the knowledge base using natural language pattern for IS-A pattern extraction, and creating multiple subclasses for the identified parent-child relationships. In aspects, the method also includes in response to not being able to identify a latent hierarchal structure in the knowledge base, decomposing the knowledge base into peer nodes of the knowledge base; and performing pattern matching using natural language techniques to identify objects having similar relationships to a computer node similarity. In aspects, the method includes using a clustering analyzing in a Voronoi cells cluster initialization formula.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a computing device, that a size of an object cluster of a knowledge graph meets a threshold value indicating under-specification of a knowledge base of the knowledge graph;
   determining, by the computing device, sub-classes for objects of the knowledge graph;
   re-initializing, by the computing device, the knowledge graph based on the sub-classes to generate a refined knowledge graph, wherein the size of the object cluster is reduced in the refined knowledge graph; and
   generating, by the computing device, an output based on information determined from the refined knowledge graph.

2. The computer-implemented method of claim 1, wherein the determining the under-specification of the knowledge base comprises:
   determining, by the computing device, a value by subtracting an actual split in the object cluster from a hypothetical split in the object cluster; and
   determining, by the computing device, the under-specification of the knowledge base based on the value being greater than or equal to zero and greater than or equal to a predetermined threshold number.

3. The computer-implemented method of claim 1, wherein the determining the sub-classes for the knowledge graph comprises determining parent-child relationships within a latent hierarchical structure of the knowledge base.

4. The computer-implemented method of claim 3, wherein the determining the parent-child relationships comprises identifying the parent-child relationships in the knowledge base using natural language processing for pattern extraction.

5. The computer-implemented method of claim 1, wherein the determining the sub-classes for the knowledge graph comprises determining the sub-classes for the knowledge graph based on peer nodes.

6. The computer-implemented method of claim 5, wherein the determining the sub-classes comprises performing pattern matching using natural language processing to identify objects having a calculated node similarity meeting a threshold value.

7. The computer-implemented method of claim 1, further comprising determining, by the computing device, over-specification of the knowledge base by performing a clustering analysis utilizing a Voronoi cells cluster initialization formula.

8. The computer-implemented method of claim 7, further comprising re-initializing, by the computing device, the refined knowledge graph based on the determining the over-specification to generate an updated knowledge graph wherein entities of over-specified object clusters of the refined knowledge graph are subsumed into a single cluster of the updated knowledge graph.

9. A computer program product comprising a computer readable storage medium having program instructions embodied therewith, the program instructions executable by a computing device to cause the computing device to:
generate a knowledge graph from a knowledge base;
determine that a size of an object cluster of the knowledge graph meets a threshold value indicating under-specification of the knowledge base;
determine sub-classes for objects of the knowledge graph; and
re-initialize the knowledge graph based on the sub-classes to generate a refined knowledge graph, wherein the size of the object cluster is reduced in the refined knowledge graph.

10. The computer program product of claim 9, wherein the determining the under-specification of the knowledge base comprises:
determining a value by subtracting an actual split in the object cluster from a hypothetical split in the object cluster; and
determining the under-specification of the knowledge base based on the value being greater than or equal to zero and greater than or equal to a predetermined threshold number.

11. The computer program product of claim 9, wherein the determining the sub-classes for the knowledge graph comprises determining parent-child relationships within a latent hierarchical structure of the knowledge base.

12. The computer program product of claim 11, wherein the determining the parent-child relationships comprises identifying the parent-child relationships in the knowledge base using natural language processing for pattern extraction.

13. The computer program product of claim 9, wherein the determining the sub-classes for the knowledge graph comprises determining the sub-classes for the knowledge graph based on peer nodes.

14. The computer program product of claim 9, wherein the determining the sub-classes comprises performing pattern matching using natural language processing to identify objects having a calculated node similarity meeting a threshold value.

15. The computer program product of claim 9, wherein the program instructions further cause the computing device to determine over-specification of the knowledge base by performing a clustering analysist utilizing a Voronoi cells cluster initialization formula.

16. The computer program product of claim 15, wherein the program instructions further cause the computing device to re-initialize the refined knowledge graph based on the determining the over-specification to generate an updated knowledge graph wherein entities of over-specified object clusters of the refined knowledge graph are subsumed into a single cluster of the updated knowledge graph.

17. A system comprising:
a processor, a computer readable memory and a computer readable storage medium associated with a computing device;
program instructions to generate a knowledge graph from a knowledge base;
program instructions to determine whether a size of an object cluster of the knowledge graph meets a threshold value indicating under-specification of the knowledge base;
program instructions to determine sub-classes for objects of the knowledge graph based on a determination that the size of the object cluster of the knowledge graph meets the threshold value;
program instructions to re-initialize the knowledge graph based on the sub-classes to generate a refined knowledge graph, wherein the size of the object cluster is reduced in the refined knowledge graph;
program instructions to determine whether over-specification of the knowledge base exists by performing a clustering analysist utilizing a Voronoi cells cluster initialization formula; and
program instructions to re-initialize the knowledge graph based on the determining the over-specification to generate an updated knowledge graph wherein entities of over-specified object clusters of the refined knowledge graph are subsumed into a single cluster of the updated knowledge graph,
wherein the program instructions are stored on the computer readable storage medium for execution by the processor via the computer readable memory.

18. The system of claim 17, wherein the determining the under-specification of the knowledge base comprises:
determining a value by subtracting an actual split in the object cluster from a hypothetical split in the object cluster; and
determining the under-specification of the knowledge base based on the value being greater than or equal to zero and greater than or equal to a predetermined threshold number.

19. The system of claim 17, wherein the determining the sub-classes for the knowledge graph comprises determining parent-child relationships within a latent hierarchical structure of the knowledge base.

20. The system of claim 17, wherein the determining the sub-classes for the knowledge graph comprises determining the sub-classes for the knowledge graph based on peer nodes.

21. A computer-implemented method, comprising:
accessing, by a computing device, a knowledge graph generated for a knowledge base;
determining, by the computing device, over-specification of the knowledge base based on one or more object clusters of the knowledge graph having less than a threshold amount of data points; and
re-initializing, by the computing device, the knowledge graph based on the determining the over-specification to generate an updated knowledge graph wherein entities of over-specified object clusters of the knowledge graph are subsumed into a single object cluster of the updated knowledge graph.

22. The computer-implemented method of claim 21, wherein the determining over-specification comprises performing a clustering analysis utilizing a Voronoi cells cluster initialization formula.

23. The computer-implemented method of claim 21, further comprising generating, by the computing device, the knowledge graph from the knowledge base.

24. A computer program product comprising a computer readable storage medium having program instructions embodied therewith, the program instructions executable by a computing device to cause the computing device to:

access a knowledge graph generated for a knowledge base;

determine over-specification of the knowledge base based on one or more object clusters of the knowledge graph having less than a threshold amount of data points; and re-initialize the knowledge graph based on the determining the over-specification to generate an updated knowledge graph wherein entities of over-specified object clusters of the knowledge graph are subsumed into a single object cluster of the updated knowledge graph.

25. The computer program product of claim 24, wherein the determining over-specification comprises performing a clustering analysis utilizing a Voronoi cells cluster initialization formula.

* * * * *